(12) United States Patent
Szczudrawa

(10) Patent No.: US 7,490,900 B2
(45) Date of Patent: Feb. 17, 2009

(54) VEHICLE SEAT

(75) Inventor: Dominik Szczudrawa, Warszawa Wesola (PL)

(73) Assignee: Faurecia Autosize GmbH, Stadthagen (DE)

( * ) Notice: Subject to any disclaimer, the term of this patent is extended or adjusted under 35 U.S.C. 154(b) by 0 days.

(21) Appl. No.: 11/727,395

(22) Filed: Mar. 26, 2007

(65) Prior Publication Data

US 2007/0222263 A1 Sep. 27, 2007

(30) Foreign Application Priority Data

Mar. 25, 2006 (DE) ........................ 10 2006 013 847

(51) Int. Cl.
*A47C 7/14* (2006.01)
(52) U.S. Cl. ............................... 297/284.9; 297/378.12
(58) Field of Classification Search ............. 297/284.9, 297/378.12
See application file for complete search history.

(56) References Cited

U.S. PATENT DOCUMENTS

| 4,370,000 | A | | 1/1983 | Kazaoka et al. | |
|---|---|---|---|---|---|
| 4,636,000 | A | | 1/1987 | Nishino | |
| 5,673,972 | A | * | 10/1997 | Dudash et al. | ......... 297/378.12 |
| 6,068,336 | A | * | 5/2000 | Schonauer | ............... 297/284.9 |
| 6,905,170 | B2 | | 6/2005 | McMillen et al. | |
| 7,140,680 | B2 | * | 11/2006 | McMillen et al. | ........ 297/284.9 |
| 7,172,248 | B2 | * | 2/2007 | McMillen et al. | ........ 297/284.9 |
| 7,172,253 | B2 | | 2/2007 | Haverkamp | |
| 7,172,255 | B2 | | 2/2007 | Wanke | |
| 7,264,310 | B2 | * | 9/2007 | Holdampf et al. | ........ 297/284.9 |
| 7,273,243 | B2 | | 9/2007 | Prugarewicz | |
| 7,278,689 | B2 | | 10/2007 | Guillouët | |
| 7,278,690 | B2 | | 10/2007 | Bej | |
| 7,311,358 | B2 | * | 12/2007 | White et al. | ............. 297/284.9 |
| 2004/0075404 | A1 | | 4/2004 | Gerding et al. | |
| 2004/0140705 | A1 | * | 7/2004 | McMillen et al. | ... 297/378.12 X |

(Continued)

FOREIGN PATENT DOCUMENTS

DE 10 2004 004 402 B3 5/2005

(Continued)

OTHER PUBLICATIONS

German Office Action dated Nov. 29, 2006 in German Application No. 10 2006 013 847.3, filed Mar. 25, 2006 (3 pages).

*Primary Examiner*—Rodney B. White
(74) *Attorney, Agent, or Firm*—Shlesinger, Arkwright & Garvey LLP

(57) ABSTRACT

Vehicle seat has a seat portion and a backrest that includes side wings foldable forwardly onto the seat portion around a backrest swiveling axis to provide a materially horizontal loading area in a cargo position. Adjustment device for flatting the contour of the side wings when the backrest is folded forward onto the seat portion is provided in the side wings. In each side wing, a wing device determines the contour of the side wing with the device swiveling in a longitudinal direction on the backrest frame via a lever mechanism. Backrest can be locked and released when in the use position. A prestressed tension device is connected to the lever mechanism. The tension device exerts tension on the lever mechanism when the backrest is folded forward causing the wing device to swing horizontally inward in the direction of the backrest frame to flatten the contour of the side wings.

8 Claims, 19 Drawing Sheets

U.S. PATENT DOCUMENTS

| | | |
|---|---|---|
| 2005/0046252 A1 | 3/2005 | McMillen |
| 2006/0061184 A1 | 3/2006 | Jennings |
| 2006/0108491 A1 | 5/2006 | Behrens |
| 2006/0138842 A1 | 6/2006 | Behrens |
| 2006/0175887 A1 | 8/2006 | Behrens |
| 2006/0214485 A1 | 9/2006 | Brockschneider et al. |
| 2006/0237986 A1 | 10/2006 | Brockschneider et al. |
| 2006/0261661 A1 | 11/2006 | Kraft et al. |
| 2006/0273644 A1* | 12/2006 | Sturt et al. ............... 297/284.9 |
| 2007/0013212 A1 | 1/2007 | Meister |
| 2007/0063565 A1 | 3/2007 | Habedank et al. |
| 2007/0069561 A1 | 3/2007 | Schnabel et al. |
| 2007/0080657 A1 | 4/2007 | Gerding et al. |
| 2007/0108824 A1 | 5/2007 | Lange |
| 2007/0126272 A1 | 6/2007 | Deptolla |
| 2007/0130937 A1 | 6/2007 | Weber |
| 2007/0170770 A1 | 7/2007 | Behrens |

FOREIGN PATENT DOCUMENTS

| | | |
|---|---|---|
| DE | 103 51 157 B3 | 6/2005 |
| WO | 2005/110803 A1 | 11/2005 |

* cited by examiner

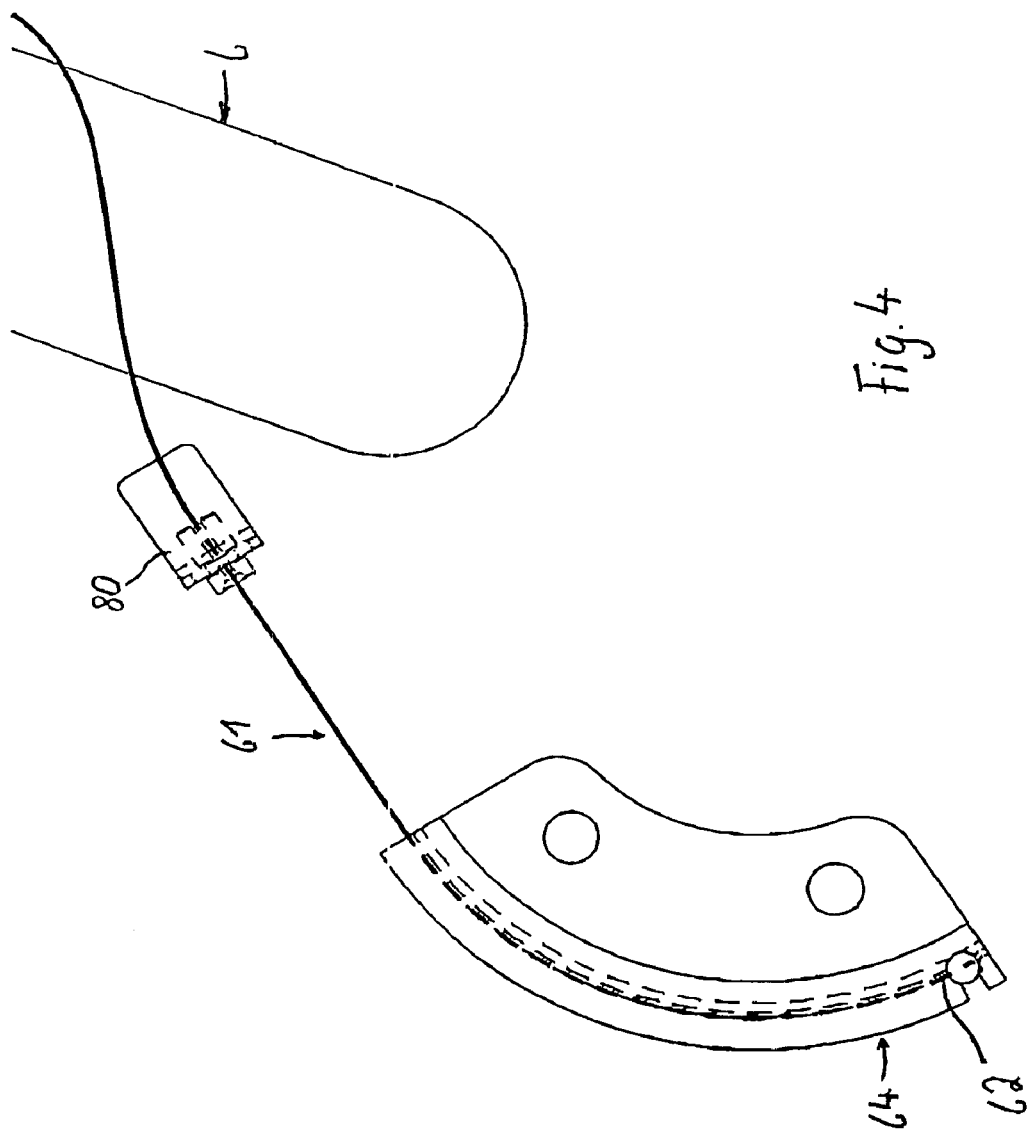

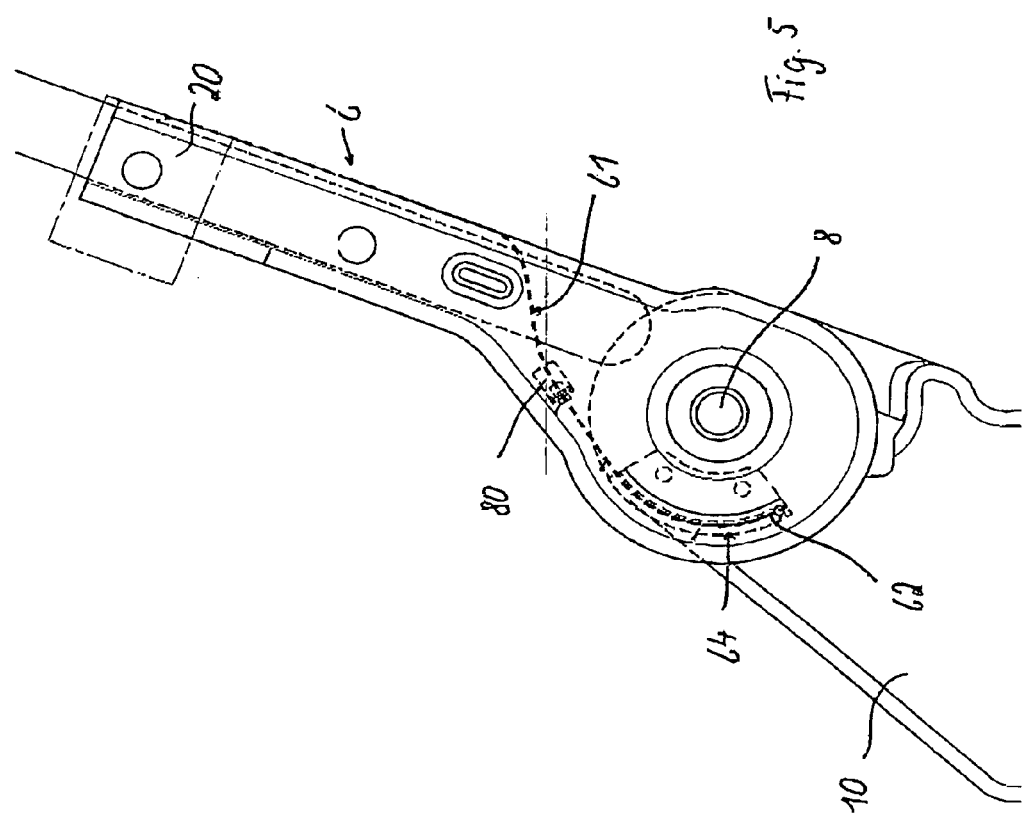

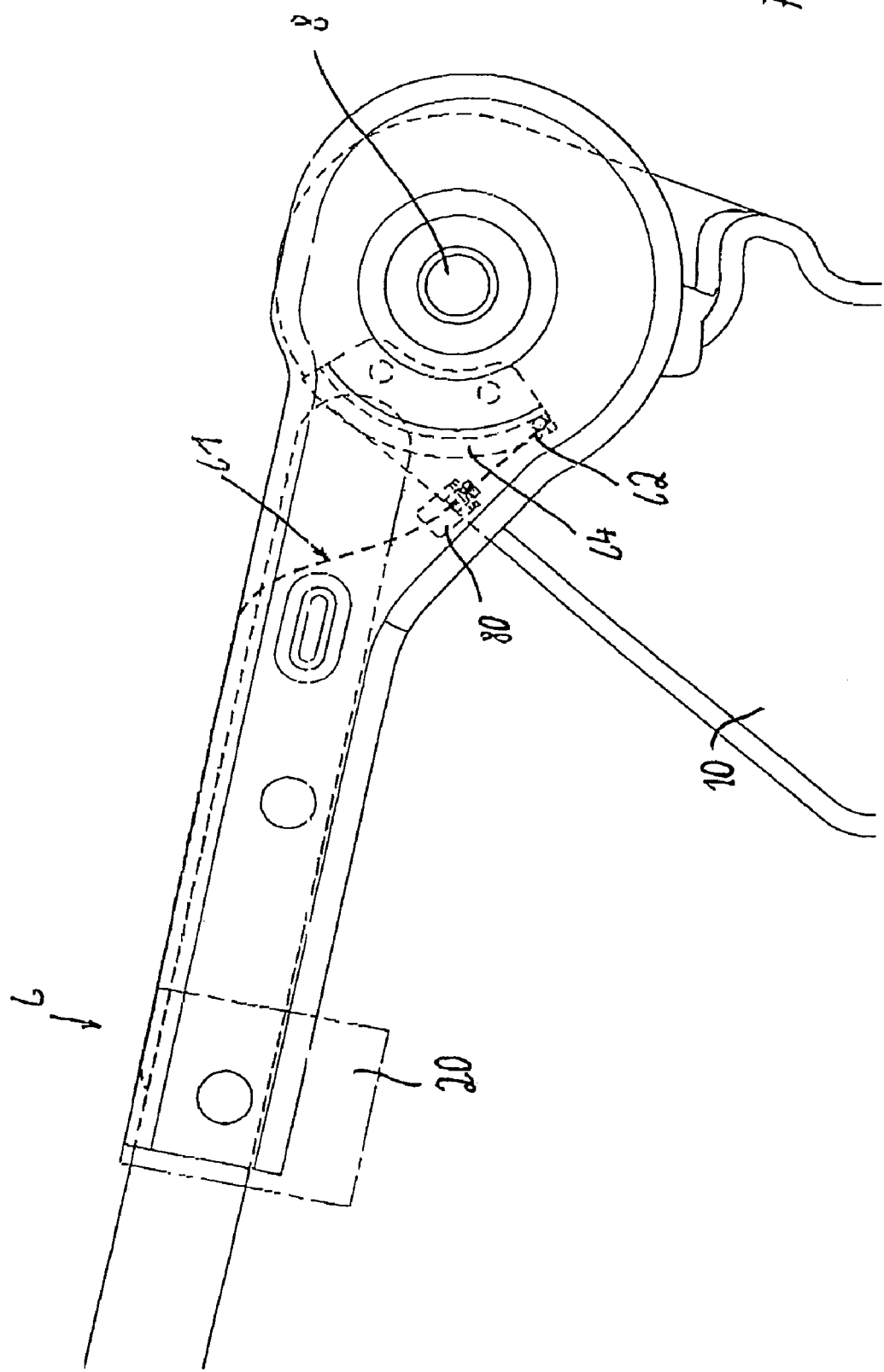

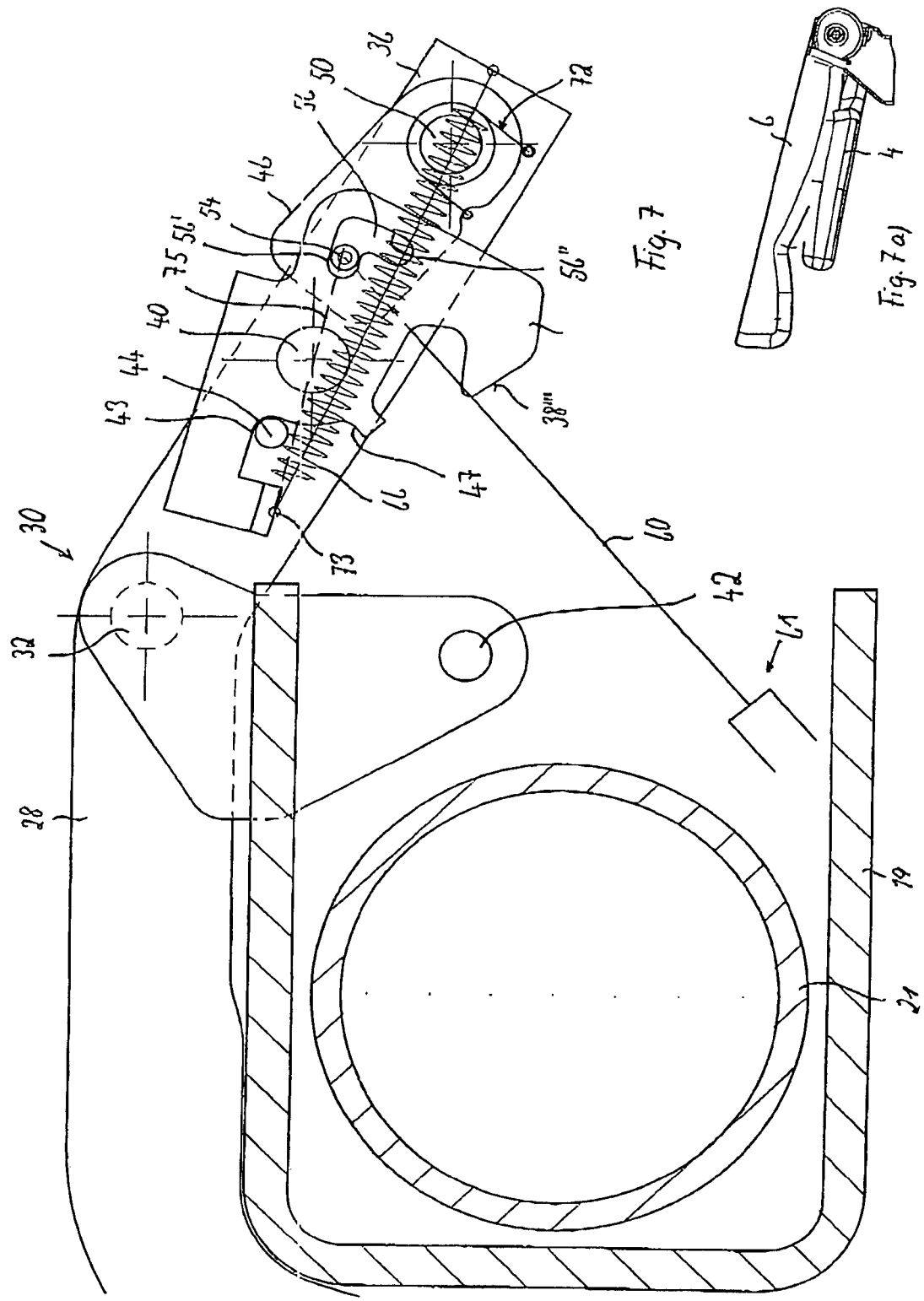

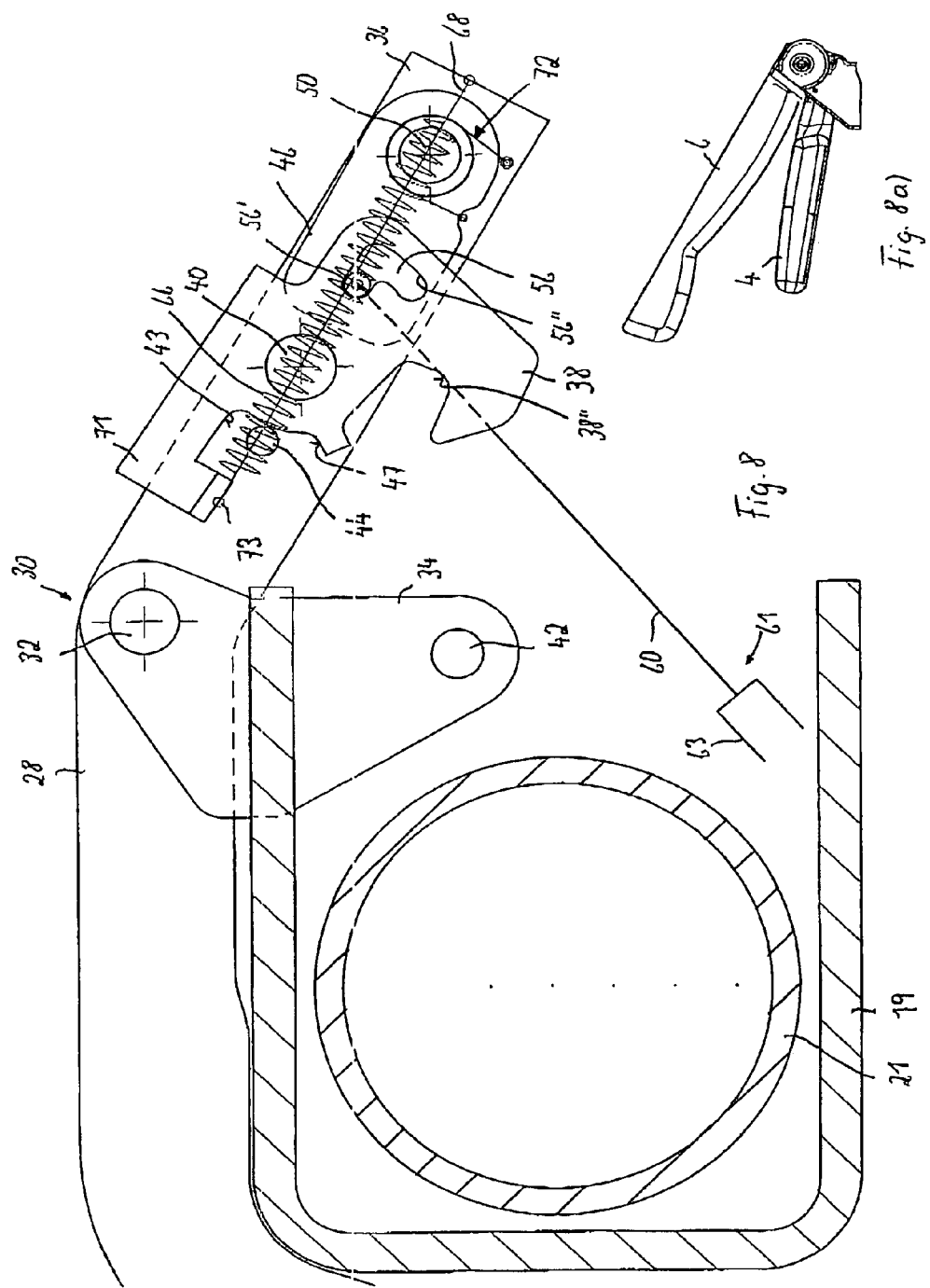

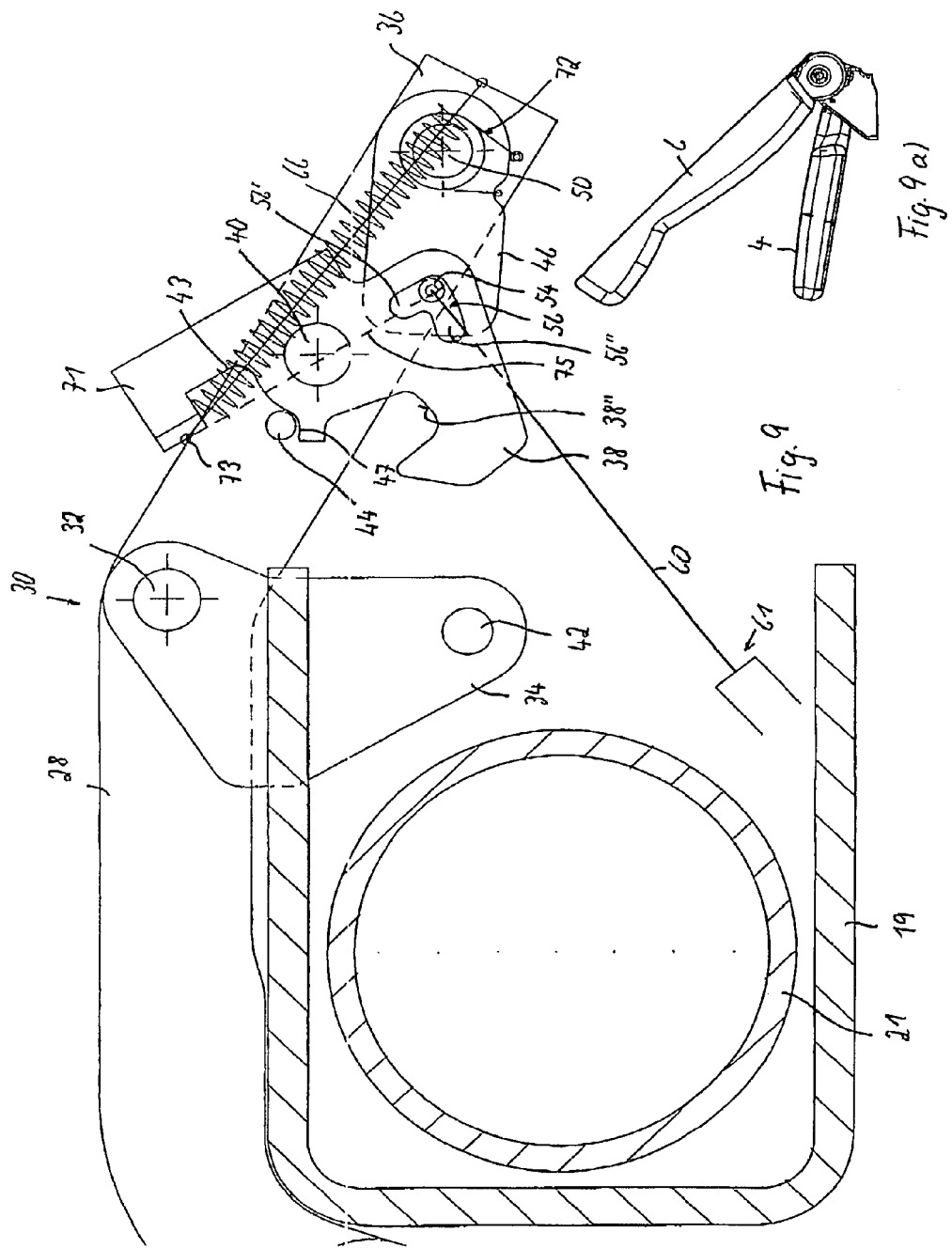

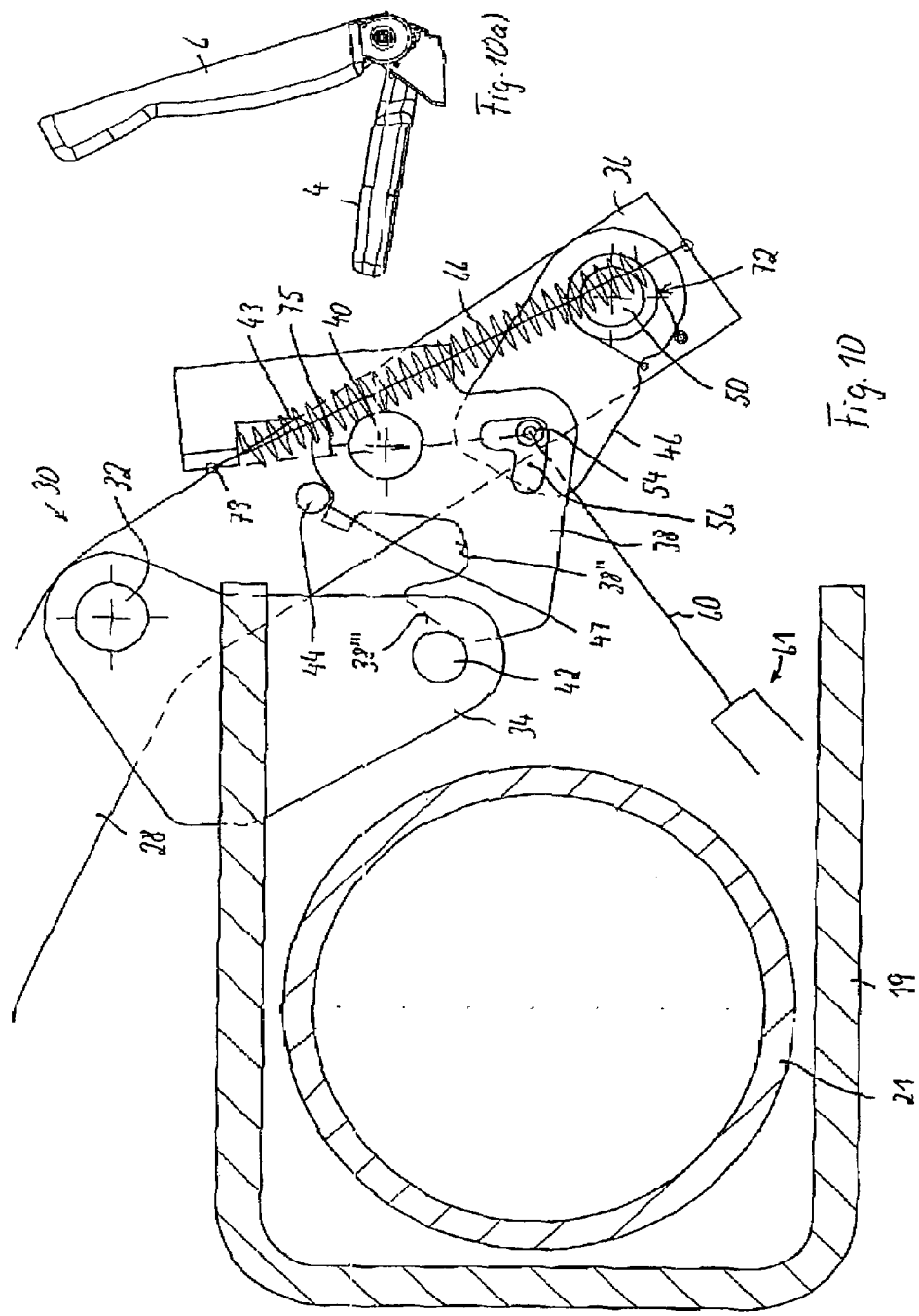

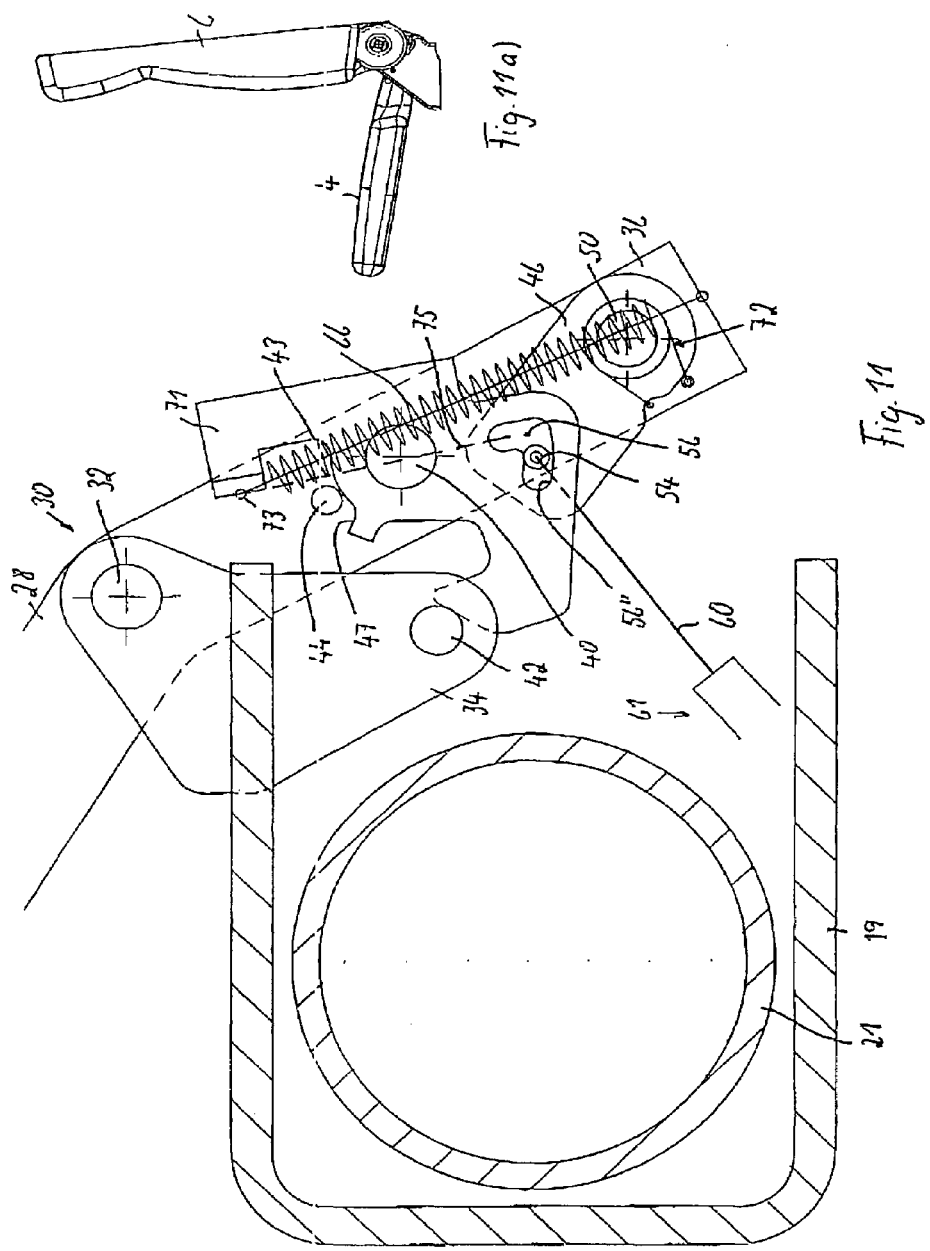

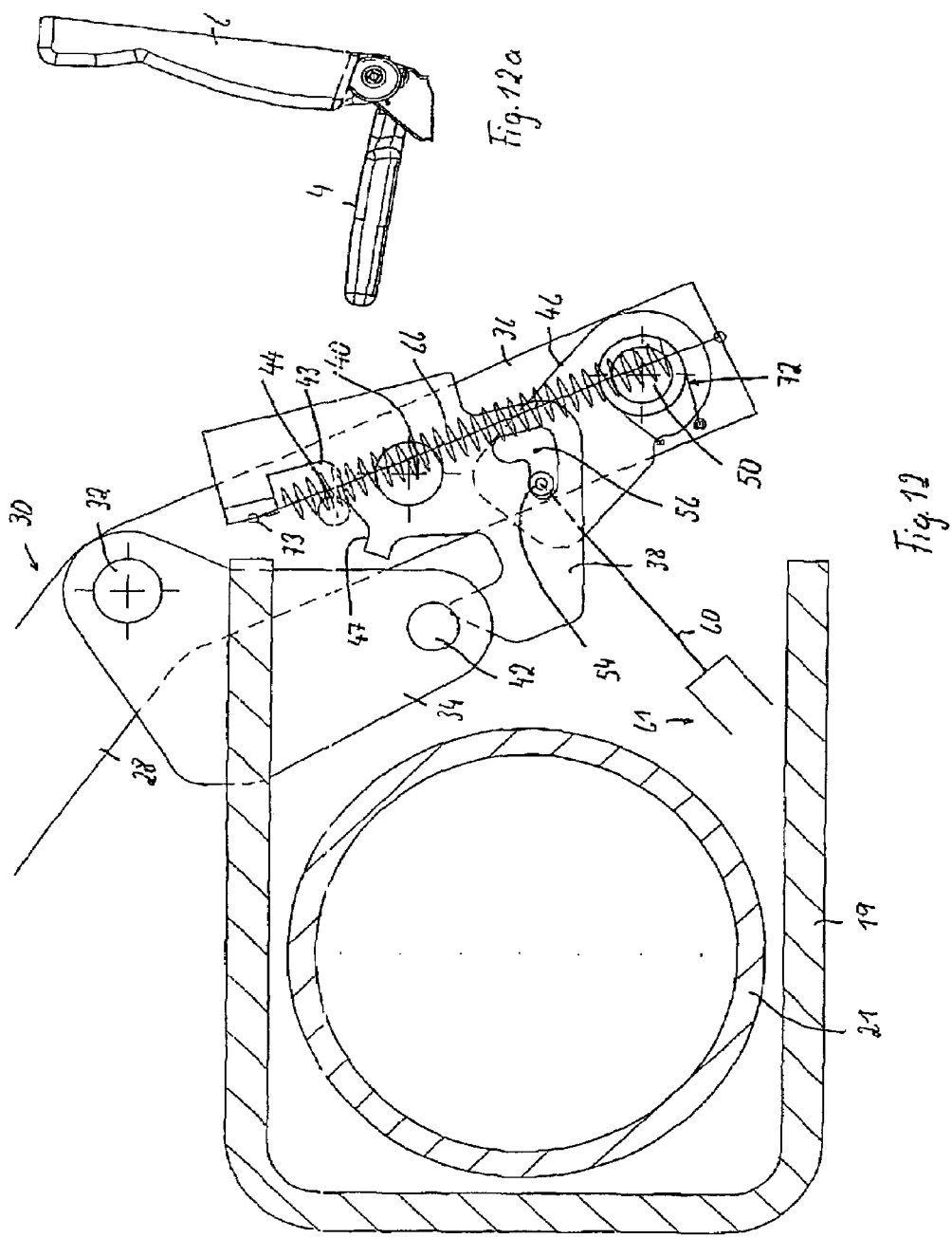

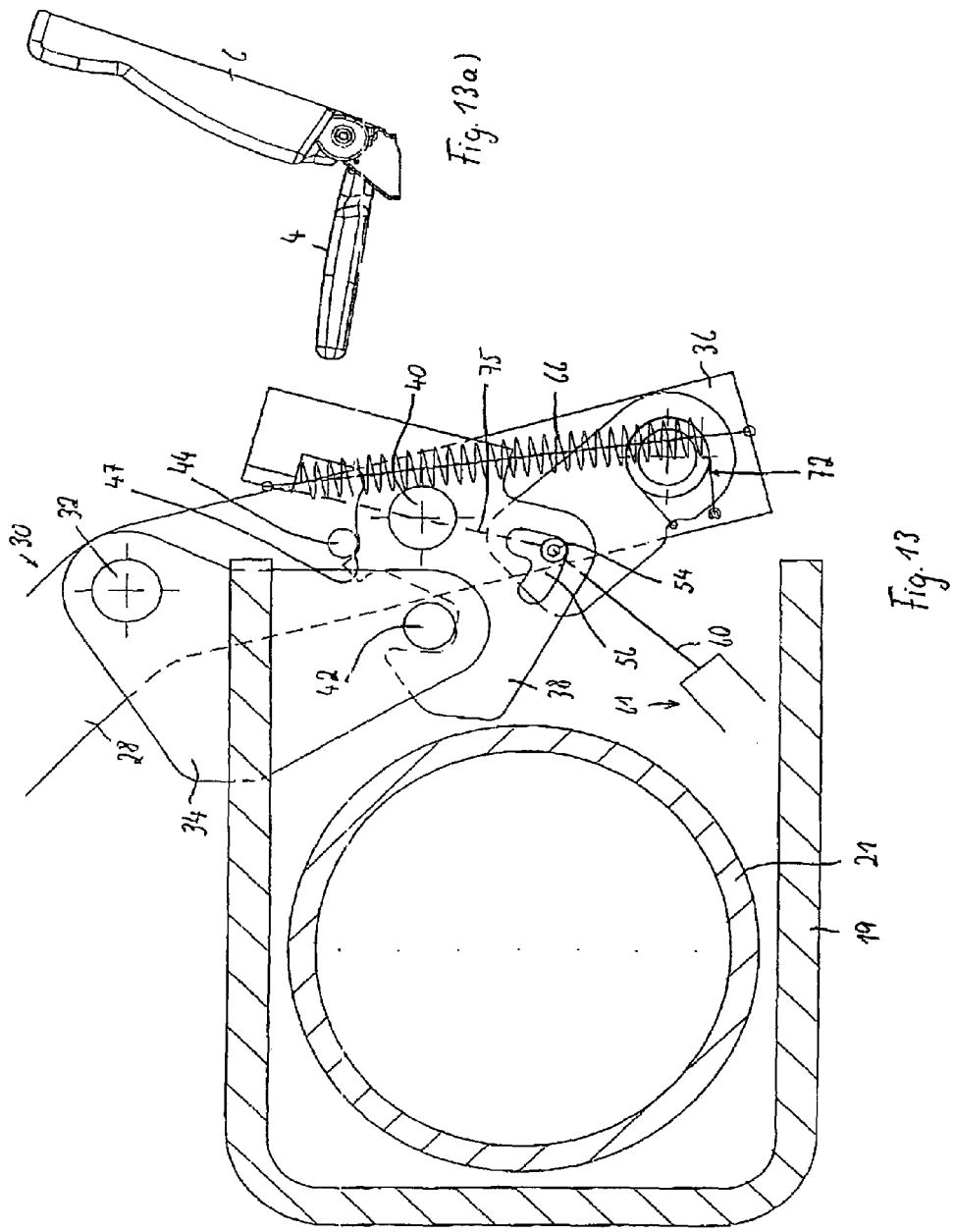

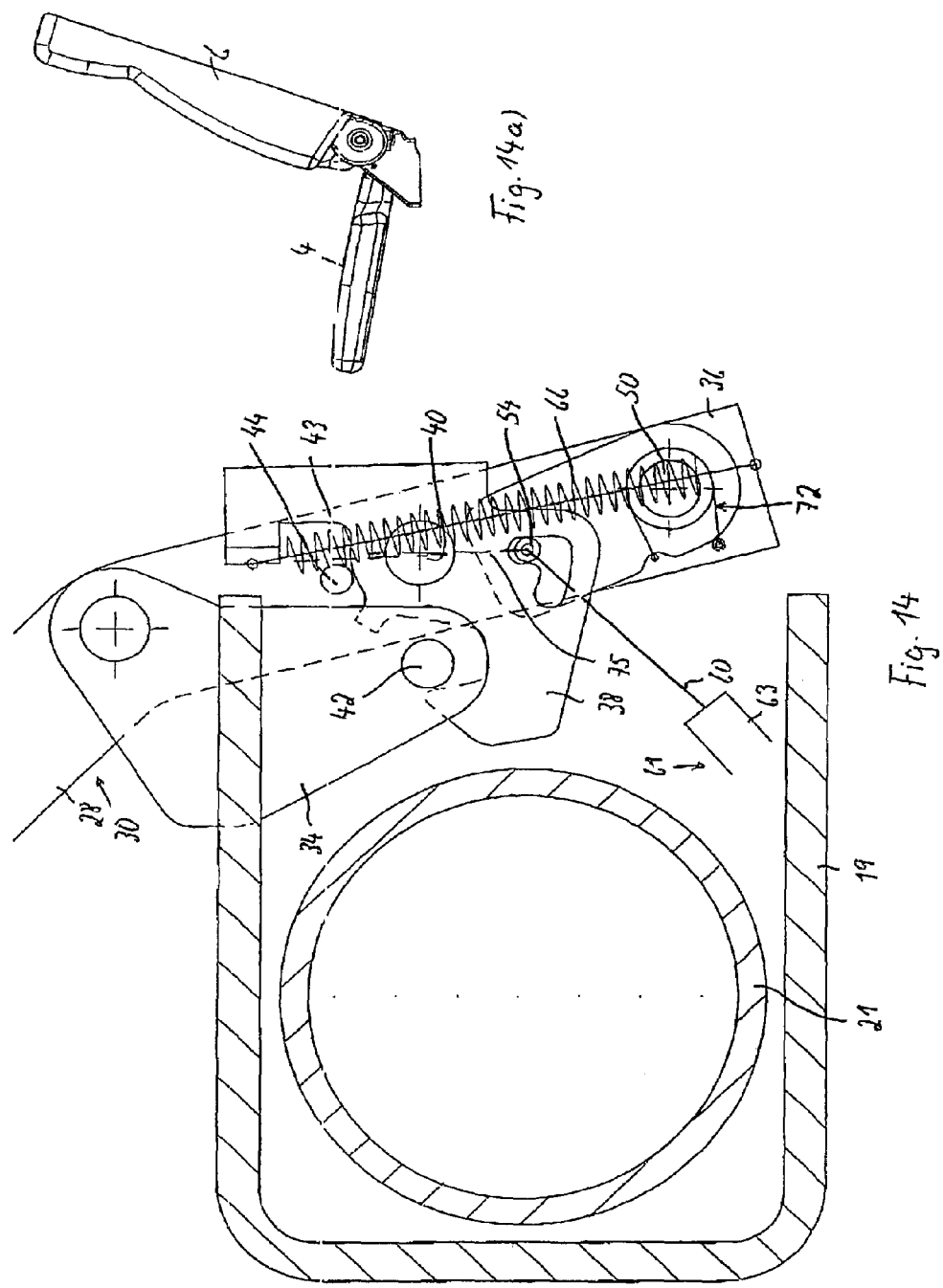

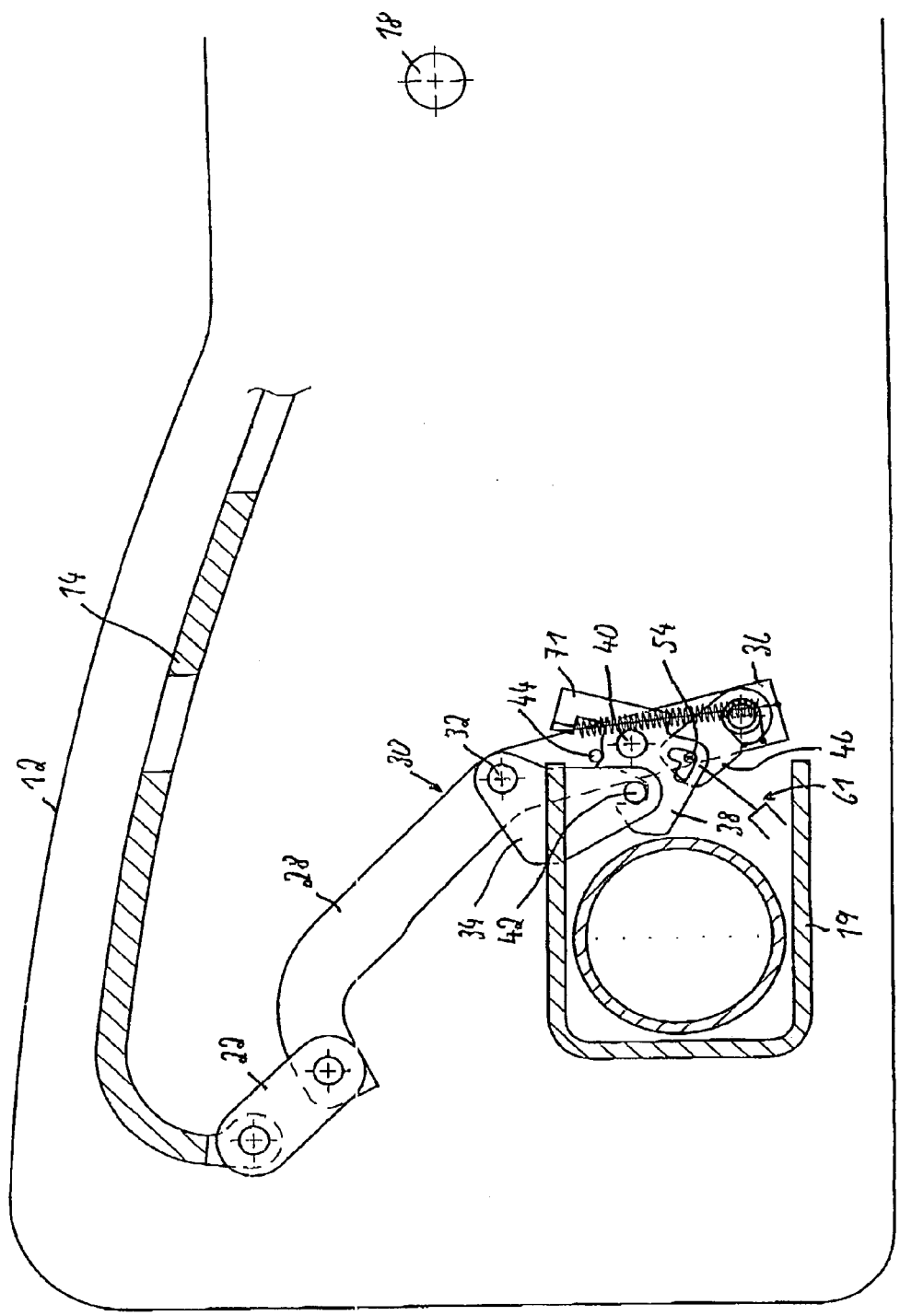

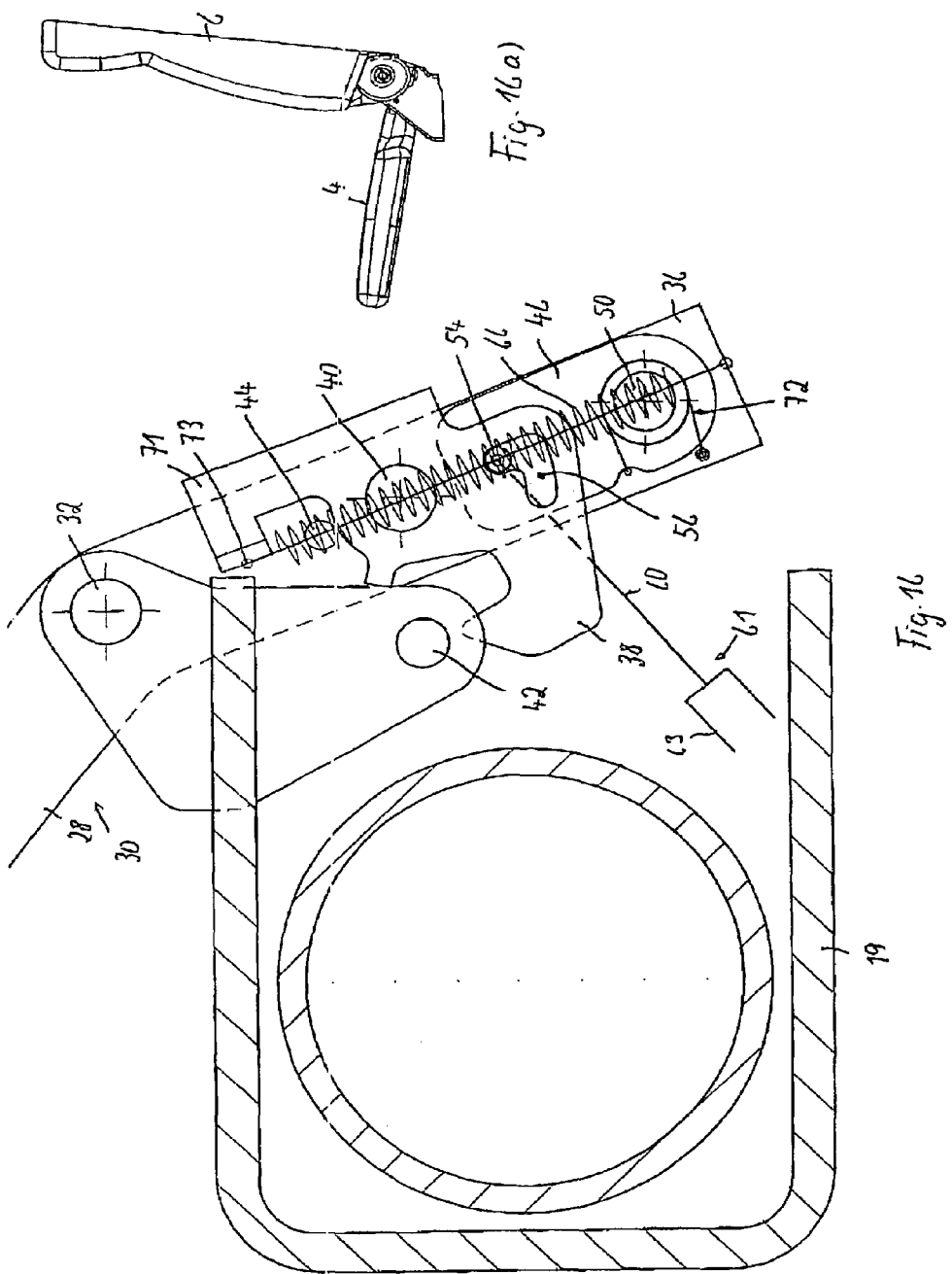

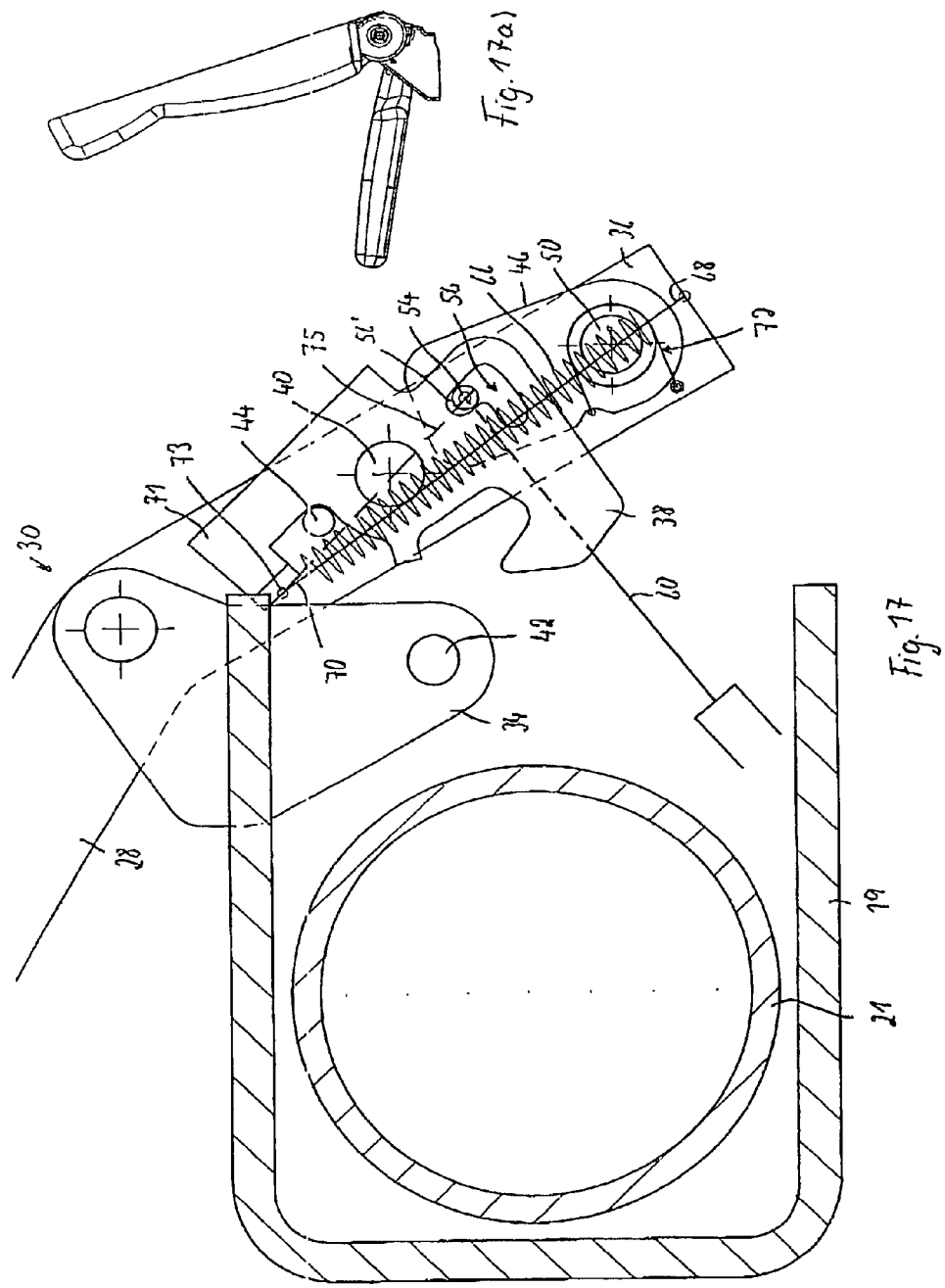

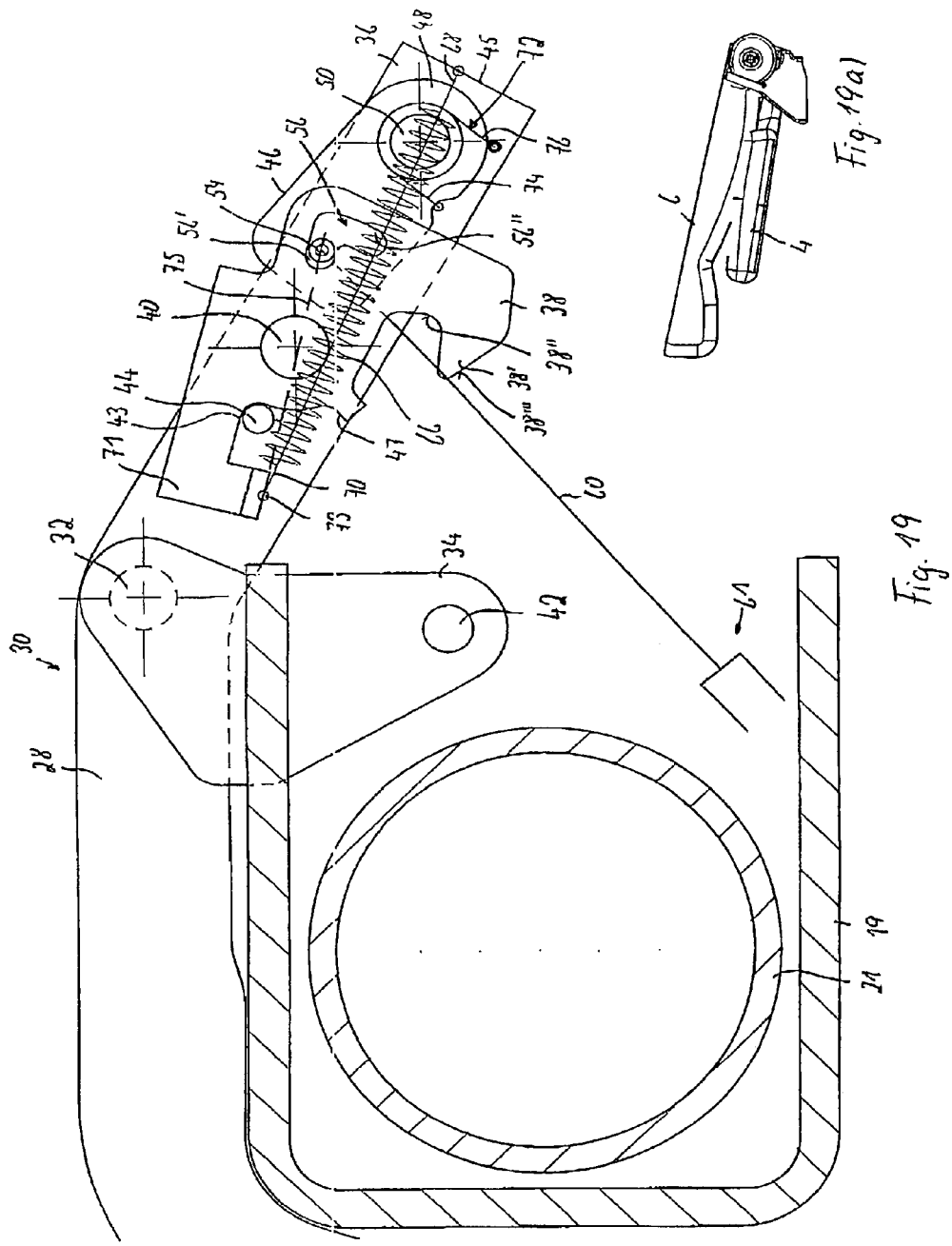

VEHICLE SEAT

CROSS-REFERENCE TO RELATED APPLICATIONS

This application claims the priority of German application no. 10 2006 013 847.3, filed Mar. 25, 2006, and which is incorporated herein by reference.

FIELD OF THE INVENTION

The present invention relates to a vehicle seat. More particularly, the present invention relates to a vehicle seat with a backrest comprising side wings. Even more particularly, the invention relates to a vehicle seat including a seat portion and a backrest with side wings that can be folded forward onto the seat portion around a backrest swiveling axis, in use, to provide a substantially horizontal loading area in a cargo position.

BACKGROUND OF THE INVENTION

A vehicle seat of the above type is described in DE 10351157 B3. The backrest of this vehicle seat can be folded forward onto the seat portion. An elastic adjustment means is arranged within the side wing that is used to adjust the height and contour of the side wing. The adjustment means is operated by way of operating means arranged within the side wing. The adjustment means is comprised of an elastic bow-shaped means whose lower end is attached to the support structure of the backrest and whose upper end is attached to a Bowden cable. The Bowden cable is stressed by means of a spring. The end of the spring facing away from the Bowden cable is connected to the support structure of the backrest. The lower end of the Bowden cable is guided between two deflection pulleys that are fixed to the body with the cable being attached to the body. When the backrest is in the use position, the bow-shaped element is tensioned, i.e. curved forward so that the side bulges have the contour that is desired for the use position. When the backrest is folded forward, the Bowden cable slackens due to the changed guide of the deflection pulleys with the resulting excess cable slack compensated for by the tension spring. The tension spring pulls in the excess cable length, causing the upper fastening point of the bow-shaped means to travel upward. This reduces the curve of the bow-shaped means and thus the deflection of the side bulges so that they are not in the way when the backrest is folded forward onto the seat portion, thus resulting materially in a horizontal loading surface comprised of the back of the backrest. In this known design the swivel motion required for folding the backrest forward is used to change, during the folding forward motion, the height and contour of the side wings that extrude forward when in the use position so that when the backrest is folded forward, the back of the side wings is aligned horizontally.

OBJECTS AND SUMMARY OF THE INVENTION

The object of the present invention is to provide another vehicle seat as described above in which the convexity in the original position and the flattening in the folded forward functional position is carried out manually via adjustment mechanisms that are actuated by the folding motion of the backrest.

The object is achieved with a vehicle seat according to the invention that has a seat portion and a backrest that includes side wings foldable forwardly onto the seat portion around a backrest swiveling axis to provide a materially horizontal loading area in a cargo position. There is an adjustment device for flatting the contour of the side wings when the backrest is folded forward onto the seat portion is provided in the side wings. In each side wing, a wing device determines the contour of the side wing with the device swiveling in a longitudinal direction on the backrest frame via a lever mechanism. The backrest can be locked and released when in the use position. A prestressed tension device is connected to the lever mechanism. The tension device exerts tension on the lever mechanism when the backrest is folded forward causing the wing device to swing horizontally inward in the direction of the backrest frame to flatten the contour of the side wings.

Other advantageous embodiments of the invention are set forth herein.

The invention proposes the use of a swiveling wing device to achieve the convexity of the side wings in the use position and the flattening of the side wings in the functional position (cargo position) with the wing device being actuated mechanically via a lever mechanism when the backrest is folded forward or back. The lever mechanism is such that the side wing device is automatically locked when in the use position. This is very advantageous in that the side wings have a secure, defined contour in the original base position.

The invention is described in more detail based on the enclosed drawing that shows an exemplary embodiment.

Relative terms such as up, down, left, and right are for convenience only and are not intended to be limiting.

BRIEF DESCRIPTION OF THE DRAWINGS

FIGS. 4, 5, 6 show the guide and arrangement of Bowden cable that are used with vehicle seats in accordance with the invention in different positions of the backrest of the vehicle seat;

FIGS. 7 through 15 show a lever mechanism used with the vehicle seat according to the invention when moving the backrest from the folded forward position back to the use position wherein consecutive phases of movement of the lever mechanism are shown;

FIGS. 16 through 19 show the lever mechanism for actuating the side wing device when the backrest is folded forward from the use position to the cargo position; and FIGS. 7a through 14a, 16a through 19a show the respective positions of the backrest.

The same reference numerals are used for identical components in the respective Figures of the drawing.

DETAILED DESCRIPTION OF THE INVENTION

Figure 1:
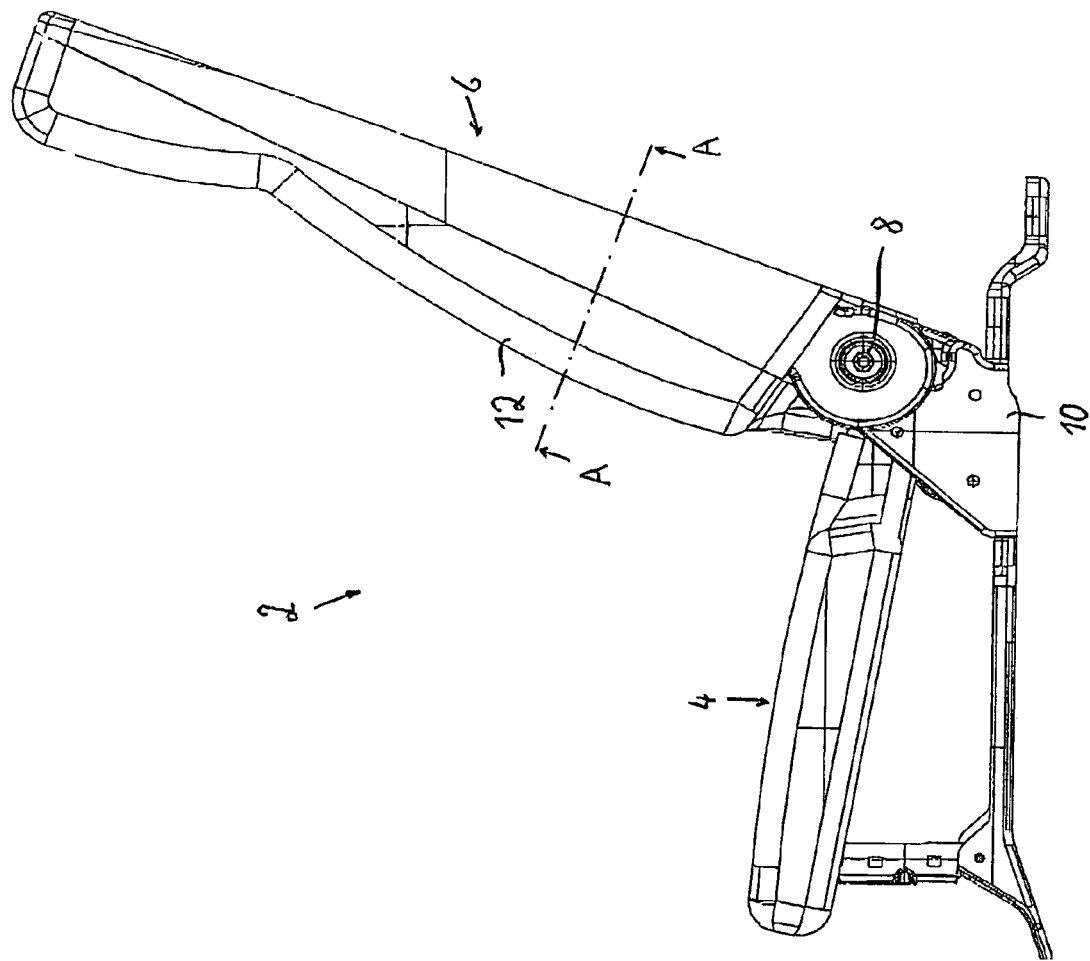
FIG. 1 shows a schematic, side view of a vehicle seat according to the invention.

The drawing shows a vehicle seat 2 with a seat portion 4 and a backrest 6 that can be folded forward onto the seat portion 4 into a horizontal cargo position. To this end, the backrest 6 can be folded around a horizontal backrest swiveling axis 8 and is linked to both sides of brackets 10 attached to the body. Please see FIG. 1.

The backrest 6 includes side wings 12 on both sides to provide better support properties for the occupant with the side wings jutting out with regard to the center contour of the backrest 6 and jutting out strongest in the use position of the backrest. Please see FIGS. 2 and 15.

The contour of the side wings 12 is supported by a wing device 14 provided in the area of the side wings 12. The wing device 14 can be moved back and forth via a lever mechanism 16 and is fastened in a swiveling manner around a swiveling axis 18 on the backrest frame 19. Reference numeral 21 refers to a backrest frame member. The wing device 14 can be a plate, a bow-shaped piece, or a similar device.

The lever mechanism 16 of each side wing 12 is provided in an area 20 of the backrest 6, see FIGS. 5 and 6, and comprises a connecting rod 22 (see FIGS. 2 and 15) that connects the end 24 of the wing device 14 that faces away from the swiveling axis 18 with one end 26 of a first arm 28 of a two-armed lever 30 in a hinged manner, with the two-armed lever being provided in a pivoting manner on a hinge pin 32 on a bracket 34 that is fastened to the backrest frame. On the second arm 36 of the two-armed lever 30 a catch 38 with a catch hook 38' and a catch opening 38" is provided in a pivoting manner around a hinge pin 40. The catch 38 is actively connected to a lock pin 42 fastened to the backrest frame and provided on the bracket 34, and a stop pin 44 provided on the second arm 36 of the two-armed lever 30 that is associated with two stops 43, 47 of the catch 38 that are provided at a distance from one another and limit the swiveling area of the catch 38. On the free end 45 of the second arm 36, an operating lever 46 is provided in a pivoting manner around an axis 50 with one end 48. On the other end 52 the operating lever 46 includes a pin 54 that engages with an angle-shaped connecting link 56 of the catch 38 and on which an end 53 of a Bowden cable 60 of a Bowden mechanism 61 with a Bowden mechanism casing 63 is provided whose other end 62 is wound on a winding coil 64 that is pre-stressed in winding direction. See FIGS. 4, 5, and 6.

The connecting link 56 includes a leg 56' that points in the direction of the hinge pin 40 of the catch 38 and a leg 56" that points in the direction of the catch hook 38'.

The catch 38 is prestressed by a spiral coiled spring 66, one end 68 of which is fastened to the end 45 of the second arm 36 and whose other end 70 is fastened to a point 73 of a catch arm 71 that faces away from the catch 38 with regard to the hinge pin 40 and on which the two stops 43, 47 are provided.

The fastening point 73 of the spiral coiled spring 66 on the catch arm 71, the hinge pin 40 of the catch 38 and the leg 56' of the connecting link 56 that points in the direction of the hinge pin 40 of the catch 38 all are provided approximately on a common line 75 (dash-dotted in FIGS. 3, 7, 9, 12, 14, 17, and 19).

A torsion spring 72 provided around the axis 50 impinges on the operating lever 46, with one end 74 of the torsion spring being fastened to the operating lever 46 and the other end 76 of the torsion spring being fastened to the second arm 36 of the two-armed lever 30. The Bowden mechanism casing 63 is fastened to a portion 80 on the backrest. See FIGS. 4, 5, and 6.

Figure 2:
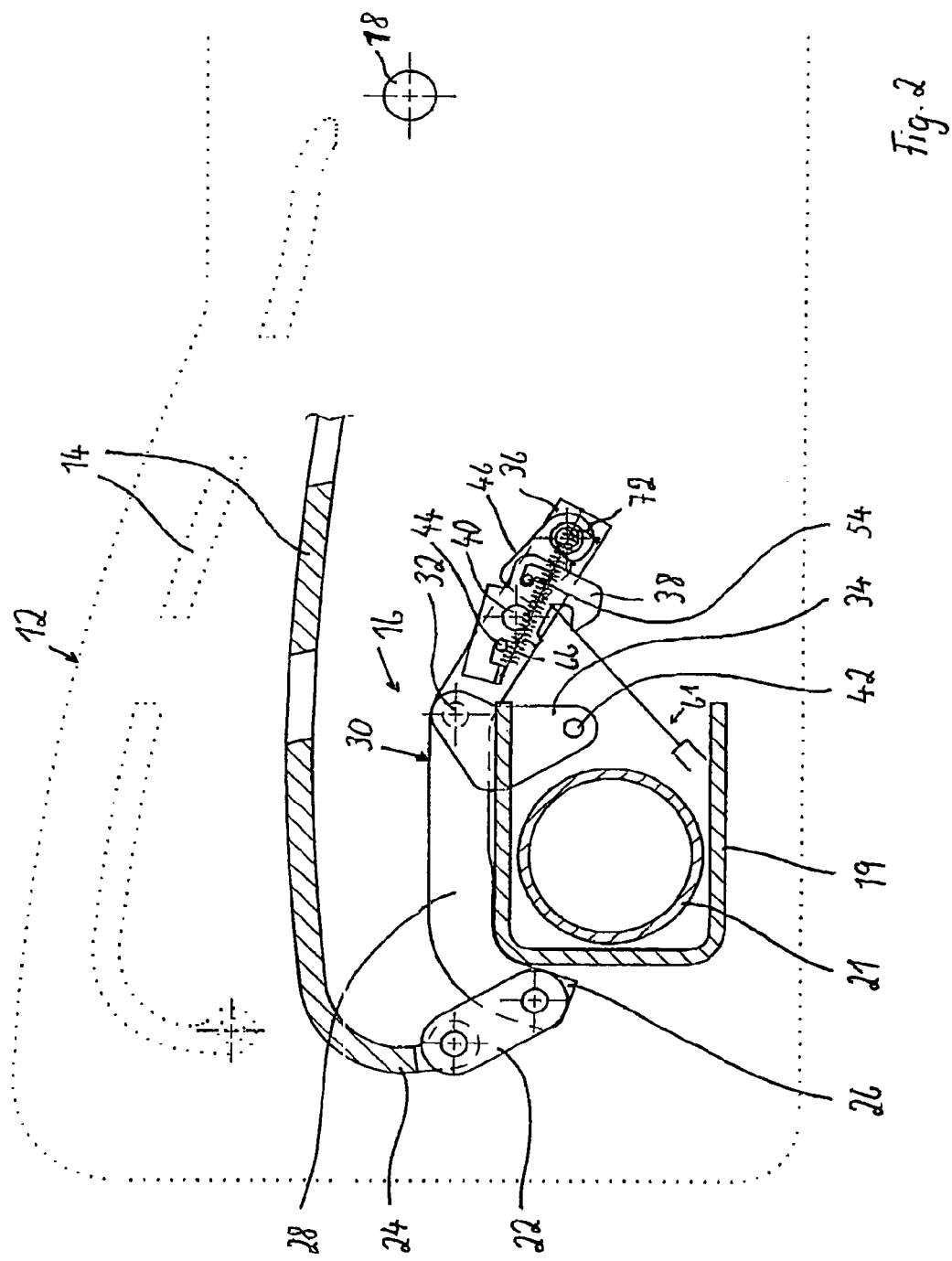
FIG. 2 shows a schematic view of section A-A through the backrest of the vehicle seat of FIG. 1.

FIG. 2 shows the side wing device 14 in a swiveled in position in which the side wings 12 have a flat contour for the cargo position and the backrest 6 is folded forward onto the seat portion 4. The use position of the side wing 12 is indicated with a doted line.

Figure 3:
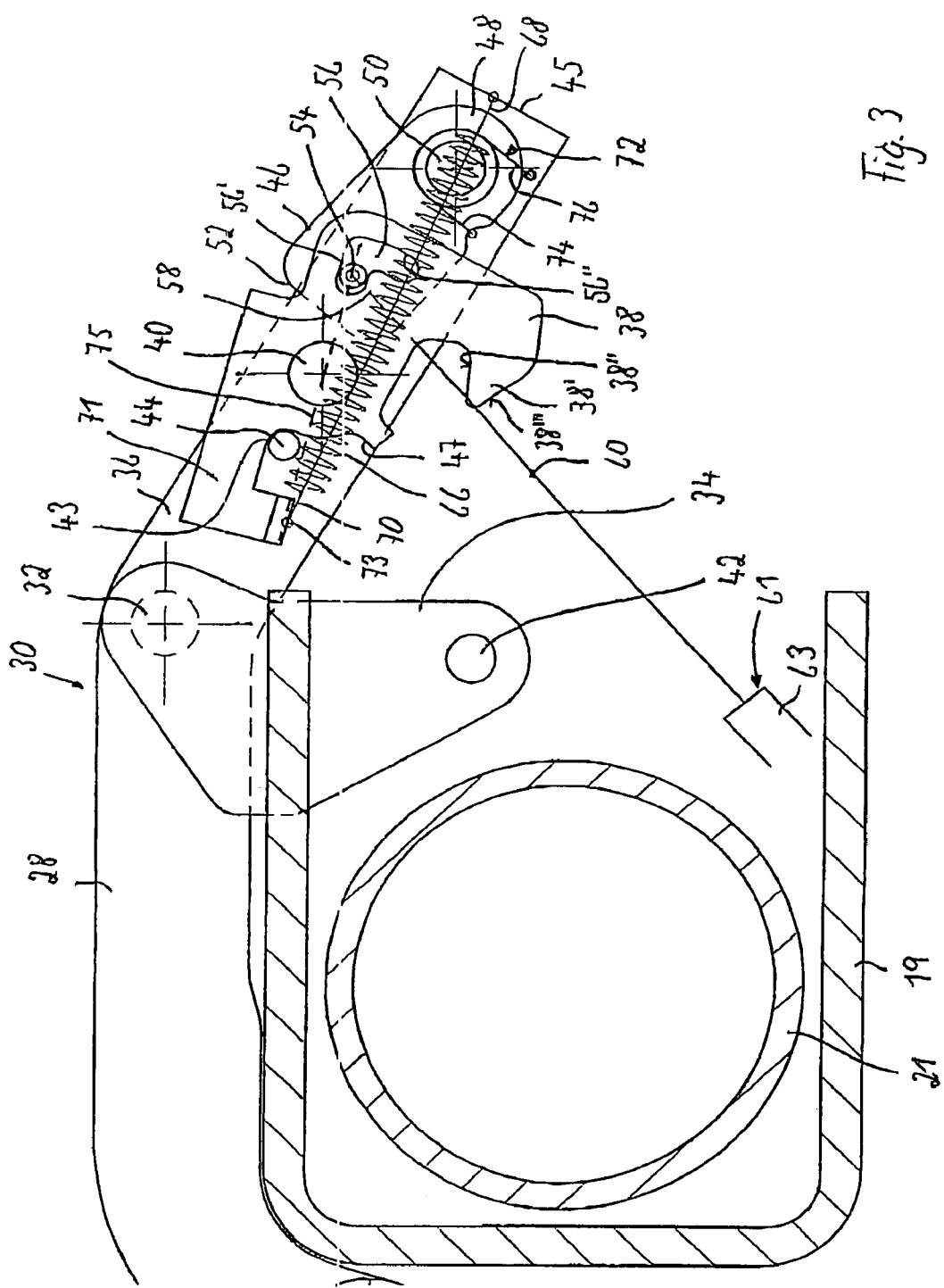
FIG. 3 shows an enlarged view of a section of FIG. 2.

When the backrest 6 is folded back from the cargo position, in which the stop pin 44 rests against a stop 43 and the pin 54 is located in the connecting link leg 56', into the use position, the Bowden cable 60 of the Bowden mechanism 61 is wound onto the winding coil 64 that is pre-stressed in winding direction with the Bowden mechanism exerting tensile force onto the operating lever 46, thus swiveling it counterclockwise (FIGS. 2, 3, and 7).

The catch 38 is located in a stable position because the pin 54 is located in the leg 56' of the connecting link 56 and the spiral coiled spring 66 exerts a counterclockwise torque on the catch 38 because it is provided on the side that faces the catch hook 38' of the line 75 that connects point 73, hinge pin 40 and leg 56' of the connecting link 56. See FIG. 3.

When the backrest 6 is swiveled back further, the operating lever 46 continues to turn and continues to swivel the catch 38 further across an unstable position (FIG. 8) in which the connecting line 75 coincides with the direction of pull of the spiral coiled spring 66. In stable positions, shown in FIGS. 9 through 10, in which the spiral coiled spring 66 is shifted to the side of the line 75 that faces away from the catch hook 38' and provides support with regard to the stable positions until the catch hook 38' is moved to rest against the lock pin 42 (See FIG. 11) and the stop pin 44 simultaneously rests against the other stop 47 and the pin 54 is moved into the transitional area between the two connecting link legs 56', 56". Starting in the position according to FIGS. 10, 11, the Bowden mechanism exerts torsion force onto the arm 36 of the two-armed lever 30 via the operating lever 46, which causes the lever 36 to swivel in a clockwise direction and together with the lever 30 the wing device 14 is swiveled accordingly as well. In the process, the pin 54 moves to the other connecting link leg 56".

The lock pin 42 ascends on a slope 38 of the catch hook 38', see FIGS. 11, 12, and 13, and swivels the catch 38 counterclockwise which causes the catch hook 38' to run below the lock pin 42 and the lock pin 42 is taken up by the catch opening 38" and furthermore the stop pin 44 is moved to rest against the other stop 47 of the catch 38 and the pin 54 is moved back to the transitional area between both connecting link legs 56', 56", see FIG. 14. In this position the backrest 6 reaches the use position and the catch 38 thus locks the wing device 14 in the use position in the hooked-out position in which the side wing 12 takes on its full contour, see FIG. 15.

Figures 18, 18A:
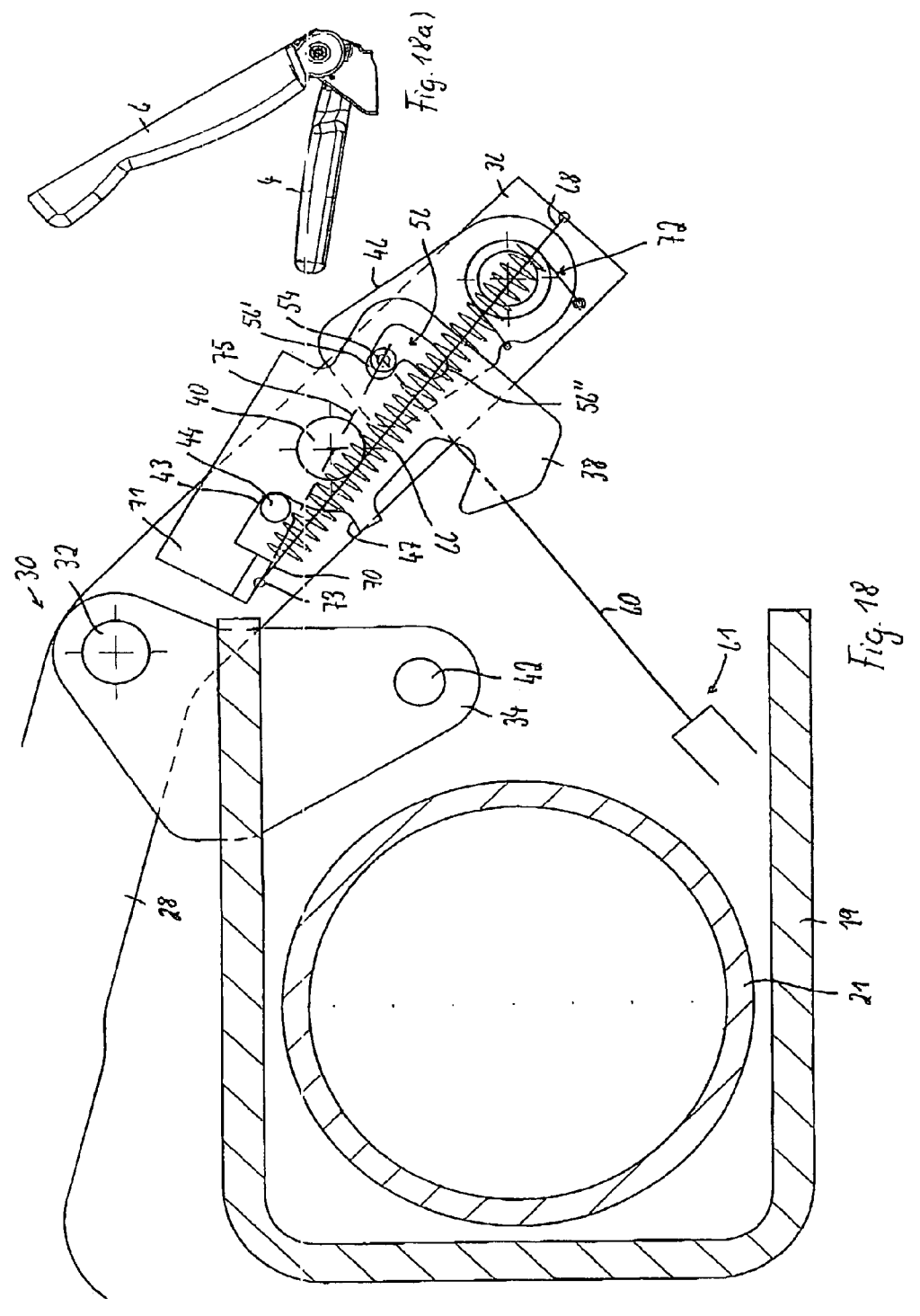

When the backrest 6 is folded forward from the use position, the cable 60 of the Bowden mechanism 61 is unwound from the coil 64 which causes the cable to be loose so that the operating lever 46 is swiveled clockwise due to the effect of the torsion spring 72 and takes up the catch 38 via the pin 54 which causes the pin 54 to move into the connecting link leg 56' and the stop pin 44 to move in the direction of the other stop 43. See FIG. 16. At the same time the arm 36 of the two-armed lever 30 is swiveled clockwise across an unstable position of the catch 38 (see FIG. 18) until the wing device 14 reaches its retracted position, FIG. 19, and the side wings 12 are flattened correspondingly.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

REFERENCE LIST 2 vehicle seat
4 seat portion
6 backrest
8 backrest swiveling axis
10 bracket
12 side wings
14 side wing device
16 lever mechanism
18 swiveling axis
19 backrest frame
20 area
21 member
22 connecting rod
24 end
26 end 28 first arm
30 two-armed lever
32 hinge pin
34 bracket
36 second arm
38 catch
38' catch hook
38" catch opening
38'" slope
40 pin
42 lock pin
43 stop
44 stop pin
45 end
46 operating lever
47 stop
48 end
50 axis
52 end
54 pin
56 connecting link
56' leg
56" leg
58 end
60 Bowden cable
61 Bowden mechanism
62 end
63 Bowden mechanism casing
64 winding coil
66 spiral coiled spring
68 end
70 end
71 catch arm
72 torsion spring
73 point
74 end
76 end
78 Bowden mechanism casing
80 portion

The invention claimed is:

1. Vehicle seat, comprising:
  a) a seat portion and a backrest with side wings that can be folded forward onto the seat portion around a backrest swiveling axis, in use, to provide a substantially horizontal loading area in a cargo position;
  b) an adjustment device provided and configured for flattening the contour of the side wings when the backrest is folded forward onto the seat portion, in use, the adjustment device being provided in the side wings;
  c) a wing device provided inside each side wing, the wing device determining the contour of the side wing, with the wing device swiveling in a longitudinal direction on a backrest frame via a lever mechanism;
  d) the backrest being locked and released when the backrest is in the use position;
  e) a prestressed tension device being connected to the lever mechanism with the tension device exerting tension on the lever mechanism when the backrest is folded forward, in use, causing the wing device to swivel horizontally inward in the direction of the backrest frame to flatten the contour of the side wings;
  f) a lever mechanism provided which includes a two-armed lever provided in a swiveling manner on a hinge pin fixed on the backrest frame, and one of whose lever arms is connected in an articulated manner to a free end of the wing device via a connecting rod, and on whose other lever arm a spring prestressed catch is provided in a pivoting manner on a hinge pin; and
  g) a spring prestressed operating lever provided around an axis with the lever having a pin jutting out to the side that extends into an angle-shaped connecting link of a catch, and on which the pull mechanism engages with one end, and that is wound onto a winding coil with another end in a prestressed manner.

2. Vehicle seat according to claim 1, wherein:
  a) the prestress of the catch is produced by a spiral coiled spring whose one end is connected to the free end of the second arm of the lever, and whose other end is connected to an arm of the catch with the arm being provided opposite the catch opening that includes a lock pin that is fixed on the backrest frame in relation to the hinge pin of the catch.

3. Vehicle seat according to claim 2, wherein:
  a) the prestress of the operating lever is generated by a torsion spring provided on the hinge pin of the operating lever, with one end of the spring engaging on the operating lever between hinge pin and a pin, and the other end being fastened to a free end of a second lever arm of the lever.

4. Vehicle seat according to claim 2, wherein:
  a) a stop pin for the arm of the catch is provided on a second lever arm of the lever with two stops being allocated to the stop pin with the stops limiting the swiveling area of the catch and being provided on the arm of the catch.

5. Vehicle seat according to claim 2, wherein:
  a) the connecting link includes a leg that points in the direction of the hinge pin of the catch and a leg that points in the direction of the catch hook.

6. Vehicle seat according to claim 2, wherein:
  a) a fastening point of a spiral coiled spring, the hinge pin of the catch, and the leg of the connecting link pointing in the direction of the hinge pin of the catch are provided approximately on a common line.

7. Vehicle seat according to claim 1, wherein:
  a) the wing device includes one of a plate and a bow-shaped device.

8. Vehicle seat, comprising:
  a) a seat portion and a backrest with side wings that can be folded forward onto the seat portion around a backrest swiveling axis, in use, to provide a substantially horizontal loading area in a cargo position;
  b) an adjustment device provided and configured for flattening the contour of the side wings when the backrest is folded forward onto the seat portion, in use, the adjustment device being provided in the side wings;
  c) a wing device provided inside each side wing, the wing device determining the contour of the side wing, with the wing device swiveling in a longitudinal direction on a backrest frame via a lever mechanism;
  d) the backrest being locked and released when the backrest is in the use position;
  e) a prestressed tension device being connected to the lever mechanism with the tension device exerting tension on the lever mechanism when the backrest is folded forward, in use, causing the wing device to swivel horizontally inward in the direction of the backrest frame to flatten the contour of the side wings; and
  f) the wing device includes one of a plate and a bow-shaped device.

* * * * *